United States Patent Office 3,053,608
Patented Sept. 11, 1962

3,053,608
PROCESS OF MAKING WOOL-LIKE CELLULOSIC TEXTILE MATERIALS
Hugh C. Gulledge, Newark, Del., assignor to E. I. du Pont de Nemours and Company, Wilmington, Del., a corporation of Delaware
No Drawing. Filed Apr. 17, 1959, Ser. No. 807,006
11 Claims. (Cl. 8—117)

This invention pertains to the production of improved metallated cellulosic materials, and more particularly to improved titanated forms of cellulosic textiles.

Cellulose, both synthetic and natural and in the form of fibers, films, sheets and coatings, including cotton, rayon, linen, wood pulp, etc., can be treated with various organic esters to impart desired properties thereto. For example, cotton and linen fabrics that are very durable and washable do not have desirable wool-like properties. Treatment of an amine-swollen form of such cellulose material with, for instance, a Fourth Group or antimony organic metal ester to obtain, for example, a titanated or zirconated product will impart thereto such desired properties as wrinkle resistance, flame resistance, mildew resistance and improved hand and appearance. In such metallation procedures, the anhydrous amine-swollen cellulose is contacted with an alkyl ester of the metal or mixtures thereof, excess reagents are removed by solvent washing, and the anhydrous metallated intermediate is then immersed in water to convert the highly tenderized amine-swollen meltallated intermediate into substantially its original form but possessing, due to its metal oxide component, the new, desirable properties alluded to. Alkyl titanate use in this process is most advantageous for obtaining improved hand fullness, wrinkle resistance and wool-like characteristics. However, titanium in close association with organic matter promotes photodegradation. For example, exposure of titanated cellulose to sunlight results in quite rapid loss of cellulose tensile and tear strength, and causes other problems to arise, including dye color loss due to fading on such exposure.

The photodegradation of tensile strength can be advantageously overcome to a large extent by the combined use of alkyl titanates with alkyl antimonites in the metallation, resulting in products comprising cellulose impregnated with oxygen compounds of both titanium and antimony. However, antimony use for this purpose is attended with certain drawbacks. Thus, to obtain maximum wool-like characteristics, a relatively high (20–35%, calculated as the oxide) content of titanium is required. When antimony is introduced along with titanium, the amount of titanium which will be accepted by cellulose decreases roughly in proportion to the amount of antimony used. Furthermore, in such metallation by antimony ester use, quite large quantities of expensive antimony (from 5–10%, based on the weight of the dry product) are required to satisfactorily inhibit photodegradation.

It is among the particular objects of this invention to overcome the susceptibility to photodegradation of a metallated, especially titanated cellulose product with respect to both loss of tensile strength and poor dye color retention on exposure to sunlight, and to provide novel and effective methods for accomplishing such objects. Further particular objects are to provide relatively stable forms of metallated cellulosic materials especially fibers and textiles having increased liveliness, wool-like, crease-resistant, mildew-resistant, abrasion-resistant and other advantageous properties, as well as greater warmth and insulating characteristics. A specific object is to provide a novel form of treating agent which is more effective than antimony esters employment which will be less likely to decrease the possible titanium or other metal content of the primary metallating agents in the converted, final cellulosic material. Other objects and advantages of the invention will be evident from the ensuing description of my invention.

The foregoing objects are attained in this invention which comprises producing a stabilized, organic ester modified cellulosic product or textile by subjecting an amine-swollen form of cellulosic material to contact and reaction with an anhydrous organic solvent solution of an organo-soluble salt of a heavy metal and a hydrolyzable organic ester of a metal, especially an alkyl or aryl metal ester of the ortho type, thereafter regenerating substantially the original tensile strength properties of the cellulosic material by contacting the amine-swollen tenderized product with an aqueous medium and recovering the modified stabilized product, and recovering the improved chemically modified cellulosic product.

In a more specific embodiment the invention comprises wetting an amine-swollen fibrous cellulosic material with an anhydrous organic solution of an amine complexed organo-soluble salt of a polyvalent metal such as antimony or cobalt, and an anhydrous organic solution of a mixture of an alkyl metallate of titanium and antimony, reacting said salts and metallates in a substantially nonaqueous environment with said material, subjecting the resulting tenderized material to penetration with a fluid aqueous medium to regenerate and convert the tenderized cellulose to its original shape and tensile strength.

In such specific adaptation, a relatively pure cellulosic material having an open, porous or high surface structure, such as cotton, linen, ramie or rayon, etc., can be immersed in or otherwise suitably wetted, at room or elevated temperature, with an anhydrous organic solution, comprising (*a*) a primary or secondary volatile organic amine, (*b*) an amine complexed salt of cobalt, and (*c*) a mixture of an alkyl titanate and alkyl antimonite. Thereafter, the mixture is heated up to temperatures not exceeding the boiling point of the amines present and until formation occurs of a highly tenderized metallated ester-amine intermediate. This intermediate is then separated from the organic liquid through evaporation or draining, and the recovered intermediate is then subjected to treatment or penetration with water or other aqueous media in order to regenerate or convert it to the original cellulose macroscopic shape and form. Following a drying treatment, the desired improved textile having the wool-like characteristics, photodegradation resistant and dye retention properties alluded to is recovered.

To a clearer understanding of the invention, the following specific examples are given. These are merely illustrative and are not to be considered as in limitation of the invention.

EXAMPLE I

A conventional type package dyeing machine provided with supporting racks to insure thorough exposure of all parts of a fabric to the solutions and treatments effected was employed in this example. This comprised a closed vessel into which staple or fabric material can be loaded and treated with a circulating liquid at controlled temperatures. A 15 gm. sample of a palin weave cotton sheeting was loaded on the racks and placed in the machine. 2500 cc. of monoethylamine were then introduced and circulated at 10° C. for 1 hour to effect preswelling of the sample. The amine was then drained off, and replaced with a solution containing 790 gms. of tetraisopropyl titanate (TPT), 1100 gms. of isopropanol, 132 gms. of monoethylamine, and 5 gms. of cobalt acetate ($CoAc_2 \cdot 4H_2O$). The machine was then closed and heated to 85° C. which gave an internal pressure of about 25 p.s.i.g. The solution was circulated over the cloth for one hour under these conditions. The apparatus was then cooled to reduce the pressure and the solution drained out. The cloth was then rinsed three times at 70° C. with isopropanol in the machine, the last rinse effluent giving no turbidity in water indicating removal of excess alkyl titanate. Water was then circulated through the cloth for 30 minutes after which the sample was centrifuged and dried. The improved fade resistance, tensile strength and other properties of this fabric compared to a control similarly treated but without such cobalt salt are shown as Sample a in Table I below.

Several other 15 gms. samples of the same type cotton sheeting were treated as in the foregoing Example but with various other metal salt solutions of varying composition as set forth in Table I below. All samples were preswollen as in said example with $C_2H_5-NH_2$. A portion of each recovered sample fabric was exposed to outdoor sunlight in Delaware on panels inclined 45° and facing south. Another portion of each was dyed with a Ponsol Jade Green[1] dye using a 4 oz. per gallon conventional vat dyeing procedure and portions of the dyed material were exposed 20 and 40 hours in a Fade-O-Meter. Similar improvements were observed with other vat dyes such as Flavone GCN (Prototype 9), and direct dyes such as Pontamine Yellow NN (C.I. 814) both on cotton and on linen fabrics. The nature of the treatments test results are also shown in the table:

fabric was removed from the centrifuge, soaked in water, washed and dried. It was found to contain 13% $TiO_2$, 5% of $Sb_2O_3$, .3% Co. It was duct free, and exhibited a tear strength, after 34 days exposure, of 1250 gm. cm./cm. and no loss of dye color.

EXAMPLE III

Example I was duplicated except that 200 grams of tetraethyl zirconate was employed in lieu of isopropyl titanate. The recovered, treated fabric contained 14% $ZrO_2$; 0.4% Co and was also dust-free, fade resistant and had a tear strength value of 600 after exposure.

While described in its application involving the use of particular amines, organic esters and metal salts, the invention is not limited thereto. It has general application to the preparation of modified cellulosic substances resulting from the metallation of cellulose with organic solvent soluble hydrolyable esters or mixtures preferably of the ortho type and corresponding to the formula $M(OR)_x$ in which M includes such polyvalent metals as titanium, zirconium, hafnium, thorium from group IV-A of the periodic table of elements, and aluminum and iron (ferric), e.g., metals which form water-insoluble oxides and have a coordination number at least one greater than the valence of the metal in the oxide form; R is a mono-

*Table I*

TITANATION WITH TPT-METAL AMINE COMPLEX

| Code | Swelling, $C_2H_5NH_2$ | | Titanation—1 hr. 85°C./25 lbs., solution | | | Heavy metal salt, g. | $TiO_2$, percent | Other, percent | Tensile strength [1] | | Loss of dye [2] color | |
|---|---|---|---|---|---|---|---|---|---|---|---|---|
| | Time, hrs. | Temp., °C. | TPT, g. | $C_3H_7OH$, g. | $C_2H_5NH_2$, g. | | | | Exposure outside, days | Elmendorf tear, g.cm./cm. | 20 hrs. | 40 hrs. |
| | | | | | | Untreated cotton control | | | None | 1,210 | | |
| | | | | | | Untreated cotton control | | | 34 | 1,150 | | |
| | 1 | 10 | 790 | 1,400 | | Titanated control | 14.6 | | 34 | 288 | 4D | 4D |
| a | 1 | 10 | 790 | 1,100 | 132 | 5 Co(CH₃COO)2.4H₂O | 15.5 | 0.4 Co | 34 | 631 | 0 | 1 |
| b | 1 | 10 | 790 | 1,100 | 164 | 5 Cu(C₂H₃O₂)₂.H₂O | 15.9 | 0.6 Cu | 34 | 608 | 0 | 1 |
| c | 1 | 10 | ²790 | 1,100 | 151 | 5 Co(C₂H₃O₂)₂.4H₂O | 12.6 | 7.0 Sb₂O₃, 0.3 Co | 34 | 1,370 | 0 | 0 |
| c' | 1 | 10 | ³790 | 1,100 | 151 | 5 Co(C₂H₃O₂)₂.4H₂O | 12.6 | 7.0 Sb₂O₃, 0.3 Co | None | 1,430 | | |
| d | 1 | 10 | 790 | 1,100 | 130 | 30 Co(C₃H₇O₂)₂.4H₂O | 16.0 | 1.5 Co | 34 | 1,205 | 0 | 0 |
| e | 1 | 10 | 790 | 1,100 | 150 | 6 NiCl₂.6H₂O | 16.4 | Ni | 34 | 443 | 2Y | 3Y |
| f | 1 | 10 | 790 | 1,100 | 150 | 6 Mn(C₂H₃O₂)₂.4H₂O | 16.6 | 0.25 Mn | 34 | 706 | 3F | 4F |
| g | 1 | 10 | 790 | 1,100 | 150 | 6 Cr(C₂H₃O₂)₂.X H₂O | 16.6 | 0.15 Cr | 34 | 420 | 2 | 3Y |
| h | 1 | 10 | 790 | 1,100 | 150 | 30 Ce(NO₃)₄ | 16.1 | 1.3 Ce | 34 | 435 | 3 | 3Y |
| i | 1 | 10 | 790 | 1,100 | 150 | 1 Co(C₂H₃O₂)₂.4H₂O | 16.2 | 0.2 Co | 34 | 410 | 1 | 1 |
| j | 1 | 10 | 790 | 1,100 | 150 | 30 SbCl₃ | 12.2 | 7.3 Sb₂O₃ | 34 | 900 | 3Y | 4Y |
| k | 1 | 10 | 790 | 950 | 300 | 150 Cu(C₂H₃O₂)₂.H₂O | 14.5 | 5.0 Cu | 34 | 514 | 0 | 1 |

[1] Tensile strengths were determined by means of a standard Elmendorf Tearing Tester as described in Standard 414-M-42 of the Technical Association of the Pulp and Paper Industries.
[2] The method of estimating the loss of dye color was obtained by comparing the exposed portion of the fabric with an unexposed portion which had been covered by a metal clip. The values for symbols are as follows: 0—no change; 1—very slight change; 2—slight change; 3—marked change; 4—very pronounced change; Y—yellowed; F—faded; D—darkened.
[3] Together with 45 g. of $Sb(OC_3H_7)_3$.

EXAMPLE II

Employing a laboratory basket type centrifuge, modified to permit spraying of liquid into the basket and recirculation, during centrifuging, of a liquid treating agent through a fabric in the basket, a sample of the cotton fabric employed in Example I was placed peripherally in such basket. Ethylamine at 10° C. was then passed through the fabric for 30 minutes under centrifuging at 500 r.p.m. (radius 2 inches), to effect preswelling. The amine was then drained from the reservoir and a solution, comprising 960 grams of ethylamine, 240 grams of tetraethyl titanate, 5 grams of isopropyl antimonite, and 3 gms. of cobalt acetate, was passed through the cloth at 10° C. for 15 minutes during centrifuging. The circulation action was then stopped and the centrifuging speed increased to 2400 r.p.m. for 3 minutes to remove excess of liquid. The temperature of the centrifuge enclosure was then raised to 108° C. for 20 minutes and during slow rotation to effect evaporation and removal of the residual amine and by-product alcohols. The treated ---
[1] This is a dimethoxydibenzanthrone dye identified under Colour Index No. 1101 in the Colour Index of the Society of Dyers and Colourists (1954).

valent hydrocarbon or chlorinated hydrocarbon radical, such as an alkyl (methyl, ethyl, propyl, butyl, amyl, isopropyl, isobutyl, isoamyl, chlorethyl, etc.), cycloalkyl (cyclopropyl, cyclobutyl, cyclopentyl, cyclohexyl, cycloheptyl, etc.), aryl (phenyl, naphthyl, etc.), alkaryl (tolyl, xylyl, ethylphenyl, propylphenyl, etc.), aralkyl (benzyl, phenylethyl, phenylpropyl, etc.), and $x$ is 3 and 4, the valence of the mettal in its highest state of oxidation. Especially useful are compounds containing an alkyl hydrocarbon radical of an alcohol having from 1–12 and preferably from 1 to 6 carbon atoms in its chain. Specific examples of particularly useful forms of such esters include alkyl titanates, zirconates, such as titanium or zirconium tetraethylates, propylates, isopropylates, butylates, octylates, etc.; triethyl aluminate, tributyl aluminate, triethyl ferrate, etc., or mixtures thereof. Also utilizable are the various phenylates, benzylates, naphthalates, etc., of the contemplated metals. The organic, especially alkyl, antimonites such as trimethyl, triethyl, tripropyl, triisopropyl, tributyl antimonites, may be used in conjunction with the above organic metallates to aid in preventing photodegradation of tensile strength. The ester may be used in pure, anhydrous liquid form, or as a solution in an organic solvent (alcohols, benzene, toluene, xylene, cyclohexane, etc.).

Cellulosic materials generally can be advantageously treated in accordance with the invention. Most advantageous results are obtained in the treatment of cellulosic materials having an open, porous, or high surface structure, such as cotton, linen, ramie, rayon, wood, wood pulp, paper, sponges, etc. Prior to the treatment, the material is preferably purified or separated from undesired substances such as lignin or other discoloring contaminants, particularly when production of a white product is being sought. Also, the material is preferably dried prior to use but absolute dryness is not essential since traces of moisture can be tolerated. In some instances, preswelling may be accomplished by water-containing media and in such instances drying is not necessary. The subsequent metallation steps however are carried out under anhydrous conditions.

The swelling of the fibrous cellulose can be effected over a relatively wide range of temperature, from the solidification temperature for the treating fluids to the boiling points of the amines used, and preferably at from room to 180° C. temperatures. Recourse can be had to a number of swelling agents, but preferably volatile, anhydrous organic amines of the primary and secondary type are used. The wetting can be accomplished by immersion, spraying or other equivalent means with a liquid amine, or with an organic solvent solution thereof, e.g., in lower alcohols (ethanol, propanol, butanol, etc.) or in the commoner hydrocarbon solvents mentioned. The swelling operation can be carried out prior to treatment with an alkyl metallate or with the heavy metal salts, or when the swelling is done in substantially anhydrous media, it can be carried out in the presence of such heavy metal compound. Nitrogenous swelling agents useful herein include compounds containing —$NH_2$ or NH radicals. Examples thereof include short chain or small ring primary or secondary mono- or polyorganic ammonia derivatives. Liquid anhydrous $NH_3$, ethyl amine, ethylene diamine, diethylene triamine, methyl amine, phenyl amine, etc., are especially useful. Upon preswelling being attained, excess treating agent can be removed from the complexed product, and the ester and salt compound treatment herein contemplated is undertaken. The latter can be carried out, if desired, in the presence of 2 or 3% and up to 15% of the amine.

As already mentioned, the metallation is carried out in substantially anhydrous media. The ortho esters or monometallates as well as the polymetallates or the hydrolysis condensation products of the monometallates can also be employed. Since the condensed metallates may be used in this operation the presence of relatively small amounts of water in the metallation media or environment may be tolerated as long as the resulting aqueous polymerization does not proceed too far, thus rendering the polymetallates either insoluble in the media or too large to function properly within the cellulose structure. The use of tetraalkyl monometallates in substantially anhydrous media is preferred. The alkyl metallates can be brought into contact with the cellulosic material during the amine swelling step, provided the medium is substantially anhydrous. Alternatively, the alkyl metallates can be brought into contact with the cellulose subsequent to the amine swelling step but it is desirable to have an appreciable quantity of amine present. The metallation can be carried out as noted in the presence of other non-aqueous solvents such as the low boiling hydrocarbons or alcohols mentioned. After metallation, excess reagents and solvents, if any, are removed from the material by draining or washing with non-aqueous solvents, or by evaporation of the volatile solvents and swelling agents, leaving the metal components fixed in the cellulose. The resulting severely tendered intermediate (the tensile and tear strength of the fabric or yarn becomes substantially reduced, i.e., by about 10–90%, and usually by 10–30%, of its original strength) is then immersed in or otherwise contacted with aqueous media to regenerate and restore the product to the tensile strength of the original cellulose. Water or other aqueous media, such as water containing organic solvents, e.g., water and alcohol solutions or dilute aqueous media can be employed in this treatment. Such aqueous contact results in removal of the hydrolysis product of the intermediate, leaving the metal radical in reacted condition within the cellulose structure as a cellulose derivative having substantially the strength, washability and high melting point of the original fibrous cellulose material with the single fiber and fabric characteristics of wool.

Preferably, the alkyl metallates and stabilizing metal salts are dissolved in a pure liquid amine and the cellulose is subjected to treatment therewith at any temperature, say from 10° C. up to the boiling point of the amine, but preferably at not to exceed 180° C. The improved dye retention and other properties obtained by incorporating an organo-soluble ester of cobalt and antimony can also be realized employing other salts or mixtures of heavy metals including those of cerium, copper, chromium, manganese or nickel. Preferably, the anhydrous forms of such salts or their normally hydrated forms are employed. Examples of such salts include the various acetates, formates, tartrates, chlorides, bromides and nitrates of said metals. Some are soluble to some degree in alcohols so that they may be used in such form as treating agents for the cellulose. However, the organic amine complexes of these salts are much more readily soluble in the organic solvents mentioned and use of the salts at concentrations ranging up to 5% and preferably from .02–2%, calculated as the metal, in such solvents is therefore contemplated. These amine complexes may be conveniently prepared prior to introducing the metals into the treating bath.

As it is preferred that primary and secondary amines be present during the alkyl metallate treatment, it is more convenient to simply introduce the metal salt into the amine solution in which the amine complex is immediately formed. These salts, as stated, dissolve readily in organic or pure amine solutions and in the presence of the alkyl metallates. They may be added to the swelling bath prior to metallation, or they may form part of the metallating medium. It is also possible to employ a third step in which the amine swollen alkyl metallate treated cellulose material can be drained and then immersed in the organic solution of the amine complexes of such metal salts. However, this three-step operation is unnecessary and usually it is preferable to include the metal salt treatment of this invention in the metallation and amine swelling step. In its most simple procedure, I dissolve the alkyl metallate agents and amine complexed metal salts in a liquid primary or secondary amine and wet the cellulose with this mixture. When sufficient time elapses to permit desired swelling and metallation, the amine is evaporated or drained from the cellulose in the presence of the retained metal components. The combined reagent treatment presumably results in immediate metallation but it is preferred to remove the amine by evaporation from the cellulose while the latter is in contact with the alkyl metallate and metal salts treating agents. This particular procedure, in accordance with copending application Serial No. 738,925, filed June 2, 1955, insures a substantially complete reaction between the cellulose and the metallate resulting in a product which is not dusty following the next step and assures efficient utilization of the stabilizing metals.

The final step in the process involves the aqueous regeneration of the good physical properties of the final material. The amine swollen metallated anhydrous intermediate is usually considerably tenderized especially when carrying out the process in the presence of organic solvents other than the amines. The final penetration by aqueous media such as liquid water, or water vapor or steam results in the re-establishment of the high tensile strength of the cellulose material. This hydrolysis acts to further condense and polymerize the metallates by its reaction with any remaining alkyl groups, the metal becoming an integral part of the cellulose by direct chemical combination therewith. The resulting product will contain up to 40% or more of the metal or oxides of the metals used which are firmly fixed and resistant to laundering. The product exhibits such improved properties as increased bulking value, flame resistance, mildew resistance, higher bulking value, resistance to wrinkling (at least 20% and usually 30% greater than untreated cotton), resistance to loss of tensile strength on exposure to sunlight even when an alkyl antimonite is included in the treatment, and will be found to be especially resistant to dye fading and color change on exposure to sunlight.

Advantageously, the invention provides a single step method for incorporating alkyl metallates, particularly those of the group IV-A metals, and stabilizing metals in desired, effective concentration in an amine swollen cellulosic fabric. Thus, one can readily incorporate from 1–40% and preferably from 5–35%, calculated as the oxide, of the metal or metals from the metallates employed together with from 0.1% to 5.0%, calculated as the metal, of the stabilizing metal or metals of the salts used. It also enables use of smaller amounts, from .01 to 2.0% of stabilizing metals, rather than the 5–10% quantities of expensive antimony heretofore required. A further advantage resides in the fact that a complete metal treatment can be effected prior to the aqueous regeneration step and, as a result, especially when volatiles are removed by evaporation, a substantially 100% firm dust-free fixation of the metal compounds in the fabric is obtained. The improved method also provides an auxiliary treatment of metallated cellulosic fabric having new desirable wool-like properties to provide resistance to photodegradation of tensile strength and prevent loss of dyed color.

While use in the reaction of elevated or boiling temperatures is preferred, lower temperatures can be resorted to by recourse to longer times of contact. The variable reaction times, temperatures, pressure of the system when swelling and complexing as well as when reacting and tenderizing the swollen or complexed product will depend upon the nature of the cellulose treated, the physical characteristics of the swelling agent and the degree of subsequent metallization or degree of change of physical and chemical properties desired. Usually a minimum of about 30 minutes of contact is preferred in the first or swelling and complexing stage of the cellulose treatment with the ammonia derivative, while a minimum of about 15 minutes is preferred in the second or tenderizing step with the metallating reagents. In the regeneration step by water contact, a period of from about 15 minutes to one hour at room temperature can be resorted to.

During the treatments, the strength of the cellulose material undergoing modification becomes poor and fabrics such as used in the above examples lose strength to such an extent that they are easily damaged by punctures and tears. It is believed that the cellulose is degenerated under the conditions of the process by a breaking of the cross-linkage of cellulose. The titanium, or other metal, enters into combination with the cellulose and the anhydrous product has poor strength due to this lack of cross-linkage between molecular units of the cellulose fiber. Upon treatment with water, however, there is strong evidence that cross-linkage again takes place and the fabric resumes its original strength. The cross-linkage at this time is believed to be somewhat different and a new chemical bonding takes place through the titanium or other metal which has entered into the complex structure. The improved properties are believed to be due in large measure to this new cross-linkage or bonding both units of the cellulose structure. When the product has received normal washing, it is substantially nitrogen-free indicating a relatively pure metal-modified cellulosic material.

This application is a continuation-in-part of my copending application Serial No. 583,625, filed May 9, 1956, which is now abandoned.

I claim:

1. A method for preparing a stabilized cellulose textile material possessing substantially the single fiber, liveliness, crease resistance and bulk characteristics of wool, comprising reacting a cellulose textile material under anhydrous conditions in the presence of a nitrogenous chemical swelling agent for cellulose selected from the group consisting of ammonia and amine compounds which swell the cellulose and form nitrogenous complexes with the cellulose and containing a radical selected from the group consisting of —$NH_2$ and >NH with (1) an organic solvent solution of a stabilizing salt selected from the group consisting of an acetate, formate, tartrate, chloride, bromide and nitrate of a heavy metal selected from the group consisting of cobalt, copper, nickel, manganese, chromium, cerium and antimony, and (2) a water hydrolyzable organic compound selected from the group consisting of (a) a metal ester corresponding to the formula $Me(OR)_x$ wherein Me is a metal selected from the group consisting of titanium, zirconium, hafnium, thorium, aluminum and iron, and which forms a water-insoluble oxide and has a valence selected from the group consisting of 3 and 4 and has a coordination number in the oxide state at least one greater than the valence, R is selected from the group consisting of hydrogen and chlorinated hydrocarbon radicals, and $x$ corresponds to the valence of the metal, and (b) a condensed ester of said hydrolyzable metal ester resulting from the reaction of said ester with water, continuing said reaction until a highly tendered metal ester-amine cellulose intermediate product of said metal ester is formed of substantially reduced tensile and tear strength over that of the swollen cellulose textile obtained from said chemical swelling agent treatment, contacting said metal ester-amine cellulose complex intermediate product with aqueous media consisting essentially of water which regenerates and restores said product to substantially the tensile strength of the original untreated cellulose textile material, and recovering the resulting chemically modified cellulose product.

2. A method for preparing a stabilized cellulose textile material possessing substantially the single fiber, liveliness, crease resistance and bulk characteristics of wool, comprising reacting a cellulose textile material under anhydrous conditions in the presence of an alkyl amine chemical swelling agent for cellulose which swells the cellulose and forms nitrogenous complexes with cellulose, with (1) an organic solvent solution of a stabilizing salt selected from the group consisting of an acetate, formate, tartrate, chloride, bromide and nitrate of a heavy metal selected from the group consisting of cobalt, copper, nickel, manganese, chromium, cerium and antimony, and (2) a water hydrolyzable organic titanium ester corresponding to the formula $Ti(OR)_4$ in which R is selected from the group consisting of hydrocarbon and chlorinated hydrocarbon radicals, continuing said reaction until a highly tenderized metal ester-amine cellulose intermediate of said titanium ester is obtained having a substantially reduced tensile and tear strength compared to the swollen cellulose textile obtained from said chemical swelling agent treatment, subjecting said tenderized intermediate to contact with aqueous media consisting essentially of water which regenerates and restores said cellulose intermediate to substantially the tensile strength of the original untreated textile material, and recovering the resulting modified product containing in chemical combination with the cellulose from about 1% up to 40% of the metal of said ester and from about .1 to 5% of said stabilizing metal, both calculated as the oxide.

3. A method for preparing a stabilized cellulose textile material possessing substantially the single fiber, liveliness, crease resistance and bulk characteristics of wool comprising reacting a cellulose textile material under anhydrous conditions in the presence of an alkyl amine swelling agent for cellulose which swells the cellulose and forms nitrogenous complexes with cellulose, with (1) an organic solvent solution of a stabilizing salt selected from the group consisting of an acetate, formate, tartrate, chloride, bromide and nitrate of a heavy metal selected from the group consisting of cobalt, copper, nickel, manganese, chromium, cerium and antimony, and (2) a water hydrolyzable organic zirconium ester corresponding to the formula $Zr(OR)_4$ in which R is selected from the group consisting of hydrocarbon and chlorinated hydrocarbon radicals, continuing said reaction until a highly tenderized metal ester-amine cellulose intermediate of said zirconium ester is obtained having a substantially reduced tensile and tear strength compared to the swollen cellulose textile obtained from said chemical swelling agent treatment, subjecting said tenderized intermediate to contact with aqueous media consisting essentially of water which regenerates and restores said cellulose intermediate to substantially the tensile strength of the original untreated textile material, and recovering the resulting modified product containing in chemical combination with cellulose from about 1% up to 40% of the metal of said ester and from about .1 to 5% of said stabilizing metal, both calculated as the oxide.

4. A method for preparing a stabilized cellulose textile material possessing substantially the single fiber, liveliness, crease resistance and bulk characteristics of wool comprising swelling a cellulose textile material by treatment under anhydrous conditions with an amine chemical swelling agent for cellulose which forms nitrogenous complexes with cellulose, subjecting the resulting amine-treated, swollen and nitrogenous complexed cellulose product to reaction under anhydrous conditions with (1) an organic solvent solution of an alkyl amine complexed stabilizing salt selected from the group consisting of an acetate, formate, tartrate, chloride, bromide and nitrate of a heavy metal selected from the group consisting of cobalt, copper, nickel, manganese, chromium, cerium and antimony, and (2) a water hydrolyzable organic ester corresponding to the formula $Me(OR)_x$ wherein Me is a metal selected from the group consisting of titanium, zirconium, hafnium, thorium, aluminum and iron, and which forms a water-insoluble oxide, has a valence selected from the group consisting of 3 to 4 and a coordination number in the oxide state at least one greater than the valence, R is an alkyl radical, and $x$ corresponds to the valence of the metal, continuing said reaction until a highly tendered metal ester-amine intermediate of said organic ester is obtained, the tensile and tear strength of which is substantially reduced over that of the originally treated swollen cellulose textile, subjecting said intermediate product to contact with aqueous media consisting essentially of water which regenerates and restores said cellulose intermediate to substantially the tensile strength of the original untreated cellulose textile, and recovering the resulting modified cellulose product containing in chemical combination with the cellulose from about 5% to 35% of the metal of said ester and from about .1 to 5% of said stabilizing metal, both calculated as the oxide.

5. A method for preparing a stabilized cellulose textile material possessing substantially the single fiber, liveliness, crease resistance and bulk characteristics of wool which comprises reacting a cellulose textile material under anhydrous conditions in the presence of a nitrogenous chemical swelling agent for cellulose selected from the group consisting of ammonia and amine compounds which swell the cellulose and form nitrogenous complexes with the cellulose and containing a radical selected from the group consisting of $—NH_2$ and $>NH$, with a mixture of an anhydrous water-hydrolyzable alkyl ortho ester of a metal selected from the group consisting of titanium, zirconium, hafnium, thorium, aluminum and iron, and an organic solvent solution of a alkyl amine complexed salt selected from the group consisting of an acetate, formate, tartrate, chloride, bromide and nitrate of a stabilizing heavy metal selected from the group consisting of cobalt, copper, nickel, manganese, chromium, cerium and antimony, continuing said reaction until a highly tenderized metal ester-amine cellulose intermediate of said metal ester forms of substantially reduced tensile and tear strength over the swollen cellulose textile obtained from said chemical swelling agent treatment, subjecting said highly tenderized intermediate to contact with water to regenerate and restore said intermediate to substantially the tensile strength of the original untreated cellulose textile material and thereafter recovering the resulting chemically modified cellulose product.

6. A method for preparing a stabilized cellulose textile material possessing substantially the single fiber, liveliness, crease resistance and bulk characteristics of wool, comprising immersing a cellulose textile material in an anhydrous alkyl amine chemical swelling agent for cellulose which forms nitrogenous complexes with cellulose and until a swollen nitrogenous complexed cellulose product is obtained, reacting said product at temperatures ranging from 10° C. to not to exceed 180° C. under anhydrous conditions with an organic solvent solution of a mixture of water hydrolyzable alkyl ortho titanate and water hydrolyzable alkyl ortho antimonite together with an alkyl amine complexed salt selected from the group consisting of an acetate, formate, tartrate, chloride, bromide and nitrate of a stabilizing heavy metal selected from the group consisting of cobalt, copper, nickel, manganese, chromium, cerium and antimony until a highly tendered metal ester-amine cellulose intermediate of said titanate and antimonite forms of substantially reduced tensile and tear strength over the swollen cellulose textile obtained from said chemical swelling agent treatment, removing under anhydrous conditions excess unreacted titanate and antimonite reactant from said intermediate and subjecting the latter to contact with water which regenerates and restores said intermediate to substantially the tensile strength of the original untreated cellulose textile material, and thereafter recovering the resulting stabilized chemically modified cellulose product.

7. A method for preparing a stabilized cellulose textile material possessing substantially the single fiber, liveliness, crease resistance and bulk characteristics of wool, comprising immersing a cellulose textile material in an anhydrous alkyl amine chemical swelling agent for cellulose which forms nitrogenous complexes with cellulose and until a swollen nitrogenous complexed cellulose product is obtained, reacting said product at a temperature ranging from 10° C. to not to exceed 180° C. under anhydrous conditions with an organic solvent solution of a mixture of water hydrolyzable alkyl ortho zirconate and water hydrolyzable alkyl ortho antimonite together with an alkyl amine complexed salt selected from the group consisting of an acetate, formate, tartrate, chloride, bromide and nitrate of a stabilizing heavy metal selected from the group consisting of cobalt, copper, nickel, manganese, chromium, cerium and antimony until a highly tendered metal ester-amine cellulose intermediate of said zirconate and antimonite forms of substantially reduced tensile and tear strength over the swollen cellulose textile obtained from said chemical swelling agent treatment, removing under anhydrous conditions excess unreacted zirconate and antimonite reactant from said intermediate and subjecting the latter to contact with water which regenerates and restores said intermediate to substantially the tensile strength of the original untreated cellulose textile material, and thereafter recovering the resulting stabilized chemically modified cellulose product.

8. A method for preparing a stabilized cellulose textile material possessing substantially the single fiber, liveliness, crease resistance and bulk characteristics of wool, comprising immersing a cellulose textile material in an anhydrous alkyl amine chemical swelling agent for cellulose which forms nitrogenous complexes with cellulose and until a swollen nitrogenous complexed cellulose product is obtained, reacting said product at temperatures ranging from 10° C. to not to exceed 180° C. under anhydrous conditions with an organic solvent solution of a mixture of water hydrolyzable alkyl ortho titanate and water hydrolyzable alkyl ortho antimonite together with an alkyl amine complexed salt selected from the group consisting of an acetate, formate, tartrate, chloride, bromide and nitrate of stabilizing cobalt until a highly tendered metal ester-amine cellulose intermediate of said titanate and zirconate forms of substantially reduced tensile and tear strength over the swollen cellulose textile obtained from said chemical swelling agent treatment, removing under anhydrous conditions excess unreacted titanate and antimonite reactant from said intermediate and subjecting the latter to contact with water which regenerates and restores said intermediate to substantially the tensile strength of the original untreated cellulose textile material, and thereafter recovering the resulting stabilized chemically modified cellulose product.

9. A method for preparing a stabilized cellulose textile material possessing substantially the single fiber, liveliness, crease resistance and bulk characteristics of wool, comprising immersing a cellulose textile material in an anhydrous alkyl amine chemical swelling agent for cellulose which forms nitrogenous complexes with cellulose and until a swollen nitrogenous complexed cellulose product is obtained, reacting said product at temperatures ranging from 10° C. to not to exceed 180° C. under anhydrous conditions with an organic solvent solution of a mixture of water hydrolyzable alkyl ortho titanate and water hydrolyzable alkyl ortho antimonite together with an alkyl amine complexed salt selected from the group consisting of an acetate, formate, tartrate, chloride, bromide and nitrate of stabilizing copper until a highly tendered metal ester-amine cellulose intermediate of said titanate and zirconate forms of substantially reduced tensile and tear strength over the swollen cellulose textile obtained from said chemical swelling agent treatment, removing under anhydrous conditions excess unreacted titanate and antimonite reactant from said intermediate and subjecting the latter to contact with water which regenerates and restores said intermediate to substantially the tensile strength of the original untreated cellulose textile material, and thereafter recovering the resulting stabilized chemically modified cellulose product.

10. A method for preparing a stabilized cellulose textile material possessing substantially the single fiber, liveliness, crease resistance and bulk characteristics of wool, comprising immersing a cellulose textile material in an anhydrous alkyl amine chemical swelling agent for cellulose which forms nitrogenous complexes with cellulose and until a swollen nitrogenous complexed cellulose product is obtained, removing excess amine reactant from said product and reacting the swollen product at a temperature ranging from 10° C. to 180° C. under anhydrous conditions with an organic solvent solution of water hydrolyzable tetraisopropyl ortho titanate and cobalt acetate until a highly tendered metal ester-amine cellulose intermediate of said titanate forms, the tensile and tear strength of which is substantially reduced over that of the swollen cellulose textile obtained from said chemical swelling agent treatment, subjecting said intermediate to contact with water which regenerates and restores the intermediate to substantially the tensile strength of the original untreated cellulose textile material, and recovering the resulting stabilized chemically modified cellulose product.

11. A method for preparing a stabilized cellulose textile material possessing substantially the single fiber, liveliness, crease resistance and bulk characteristics of wool, comprising immersing a cellulose textile material in an anhydrous alkyl amine chemical swelling agent for cellulose which forms nitrogenous complexes with cellulose and until a swollen nitrogenous complexed cellulose product is obtained, removing excess amine reactant from said product and reacting the swollen product at a temperature ranging from 10° C. to 180° C. under anhydrous conditions with an organic solvent solution of water hydrolyzable tetraisopropyl ortho titanate, water hydrolyzable isopropyl ortho antimonite and cobalt acetate until a highly tendered metal ester-amine cellulose intermediate of said titanate and antimonite forms, the tensile and tear strength of which is substantially reduced over that of the swollen cellulose textile obtained from said chemical swelling agent treatment, subjecting said intermediate to contact with water which regenerates and restores the intermediate to substantially the tensile strength of the original untreated cellulose textile material, and recovering the resulting stabilized chemically modified cellulose product.

References Cited in the file of this patent

UNITED STATES PATENTS

| 2,009,015 | Powers | July 23, 1935 |
| 2,206,278 | Dreyfus | July 2, 1940 |
| 2,341,884 | Sowa | Feb. 15, 1944 |
| 2,525,049 | Signaigo | Oct. 10, 1950 |
| 2,980,489 | Gulledge | Apr. 18, 1961 |
| 2,980,490 | Gulledge | Apr. 18, 1961 |

FOREIGN PATENTS

| 517,464 | Great Britain | Jan. 31, 1940 |

OTHER REFERENCES

Balthis: Abstract of application S.N. 692,385, May 16, 1950 (634 O.G. 985).

Gulledge: Industrial and Engineering Chemistry, March 1950, pages 394 and 395.